United States Patent
Garg et al.

(10) Patent No.: US 7,451,486 B2
(45) Date of Patent: Nov. 11, 2008

(54) STATEFUL AND CROSS-PROTOCOL INTRUSION DETECTION FOR VOICE OVER IP

(75) Inventors: Sachin Garg, Green Brook, NJ (US); Navjot Singh, Denville, NJ (US); Timothy Kohchih Tsai, Alviso, CA (US); Yu-Sung Wu, West Lafayette, IN (US); Saurabh Bagchi, Lafayette, IN (US)

(73) Assignee: Avaya Inc., Basking Ridge, NJ (US)

( * ) Notice: Subject to any disclaimer, the term of this patent is extended or adjusted under 35 U.S.C. 154(b) by 638 days.

(21) Appl. No.: 10/955,594

(22) Filed: Sep. 30, 2004

(65) Prior Publication Data

US 2006/0075497 A1    Apr. 6, 2006

(51) Int. Cl.
*H04L 9/00* (2006.01)
*H04L 12/22* (2006.01)

(52) U.S. Cl. .................. 726/23; 726/14; 379/88.02; 370/395.52

(58) Field of Classification Search .............. 726/23
See application file for complete search history.

(56) References Cited

U.S. PATENT DOCUMENTS

| | | | |
|---|---|---|---|
| 6,279,113 B1 | 8/2001 | Vaidya | |
| 6,370,648 B1 | 4/2002 | Diep | |
| 6,609,205 B1 | 8/2003 | Bernhard et al. | |
| 6,711,127 B1 | 3/2004 | Gorman et al. | |
| 2001/0050914 A1* | 12/2001 | Akahane et al. | 370/382 |
| 2004/0165709 A1* | 8/2004 | Pence et al. | 379/201.01 |
| 2005/0083912 A1* | 4/2005 | Afshar et al. | 370/352 |
| 2005/0286466 A1* | 12/2005 | Tagg et al. | 370/329 |
| 2006/0075498 A1* | 4/2006 | Yeom | 726/23 |
| 2007/0130350 A1* | 6/2007 | Alperovitch et al. | 709/229 |

FOREIGN PATENT DOCUMENTS

WO    03/067810 A1    8/2003

OTHER PUBLICATIONS

Pogar Joel, "Data Security in a Converged Network", 2003, Siemens Information and Communication Network, pp. 1-7.*
Vuong et al., "A Survey of VOIP Intrusion and Intrusion Detection Systems", 2004, IEEE, pp. 317-322.*

(Continued)

*Primary Examiner*—Matthew B Smithers
(74) *Attorney, Agent, or Firm*—DeMont & Breyer LLC

(57) ABSTRACT

A method for detecting intrusions that employ messages of two or more protocols is disclosed. Such intrusions might occur in Voice over Internet Protocol (VoIP) systems, as well as in systems in which two or more protocols support some service other than VoIP. In the illustrative embodiment of the present invention, a stateful intrusion-detection system is capable of employing rules that have cross-protocol pre-conditions. The illustrative embodiment can use such rules to recognize a variety of VoIP-based intrusion attempts, such as call hijacking, BYE attacks, etc. In addition, the illustrative embodiment is capable of using such rules to recognize other kinds of intrusion attempts in which two or more protocols support a service other than VoIP. The illustrative embodiment also comprises a stateful firewall that is capable of employing rules with cross-protocol pre-conditions.

11 Claims, 8 Drawing Sheets

OTHER PUBLICATIONS

M. Isaka "Countermeasure against Troubles in IP Telephone which does not annoy a user, Telecommunication", Lick Telecom Corporation, vol. 21, No. 5, pp. 37-41, Apr. 25, 2004.

VoIP (SIP) Security, [online], Jan. 5, 2004, Internet <URL: http://www.forvalcreative.com/jpn/support/fw-1/V5.0/sdsummary_cpsa200310.html>.

Examiner's Office Action dated Oct. 31, 2007.

* cited by examiner

STATEFUL AND CROSS-PROTOCOL INTRUSION DETECTION FOR VOICE OVER IP

FIELD OF THE INVENTION

The present invention relates to telecommunications in general, and, more particularly, to network security.

BACKGROUND OF THE INVENTION

An intrusion is when an unauthorized user (e.g., a "hacker," etc.) attempts to break into or misuse (e.g., steal confidential data, etc.) a computer system. An intrusion-detection system (IDS) monitors messages (e.g., packets, etc.) incoming to a computer system and outgoing from the computer system, and based on these messages tries to determine whether an intrusion is being attempted. An intrusion-detection system might conclude that an intrusion attempt is in progress when an atypical or suspicious sequence of messages occurs, or when a sequence of messages matches a known "intrusion signature."

FIG. 1 depicts a schematic diagram of telecommunications system 100 in accordance with the prior art. As shown in FIG. 1, telecommunications system 100 comprises internal network 101 (e.g., a corporate metropolitan-area network, a residential local-area network, etc.), which receives messages via an external network (e.g., the Internet, etc.) and sends messages via the external network to external data-processing systems.

FIG. 2 depicts a schematic diagram of the elements of internal network 101, in accordance with the prior art. As shown in FIG. 2, internal network 101 comprises: intrusion-detection system 202, firewall 203, and computer systems 204-1 through 204-N, where N is a positive integer, interconnected as shown.

Each computer system 204-$n$, where n∈1, 2, K, N, might be a personal computer, a server, a laptop computer, a personal digital assistant (PDA) with wireless local-area network communication capability, etc.

An incoming message that is directed to computer system 204-$n$, where n∈1, 2, K, N, first passes through firewall 203, which inspects the message and decides whether to block the message from reaching its destination or to let the message through based on rules in a rule set. Examples of rules include: block all messages from domain badguys.com; block all messages except those of a certain protocol type; etc.

If firewall 203 lets the incoming message through, then intrusion-detection system 202 subsequently receives the message and inspects it. Intrusion-detection system 202 provides an additional layer of security by detecting intrusion attempts that comprise one or more messages that are allowed through firewall 203. For example, firewall 203 might restrict external access to a web server in internal network 101 to port 80, but without an intrusion-detection system, it might be possible to attack the web server itself via legitimate traffic through port 80 due to bugs in the web server software (e.g., ColdFusion, Apache, etc.). As an analogy, firewall 203 acts as a "fence" around internal network 101. A fence provides security but does not have the ability to detect when someone is trying to break in (e.g., by digging an underground tunnel, etc.). Intrusion-detection system 202, however, is able to recognize some break-in attempts that firewall 203 cannot detect.

Voice over Internet Protocol (VoIP) systems transmit voice traffic over packet-switched Internet Protocol (IP) data networks in lieu of circuit-switched telephony networks (e.g., the Public Switched Telephone Network, etc.). Typically, Voice over Internet Protocol systems are based one of two main protocols: H323 and Session Initiation Protocol (SIP). In both types of systems, VoIP user agents at the calling and called telecommunications terminals (e.g., hardphones, softphones, etc.) send and receive packets that contain encoded voice signals in accordance with the Real-time Transport Protocol (RTP). In addition, a VoIP gateway might employ a media management protocol such as the Media Gateway Control Protocol (MGCP) or MEGACO/H.248 in order to translate traffic transparently between an IP-based network and a non-IP-based network (e.g., between a PSTN phone and an IP phone, etc.).

A major advantage of VoIP is that it enables the convergence of voice and data networks. By migrating voice traffic to data networks, however, the voice network becomes vulnerable to intrusions and other attacks (e.g., denial-of-service attacks, authentication attacks, etc.) that compromise privacy, quality of service, and accurate billing. Furthermore, due to characteristics of Voice over Internet Protocol systems, some intrusion-detection systems of the prior art provide inadequate security against intrusions that employ VoIP packets (i.e., VoIP-based intrusions).

What is needed is an intrusion-detection system that is able to detect VoIP-based intrusion attempts, as well as some other kinds of intrusion attempts that exhibit some of the same characteristics as VoIP-based intrusions.

SUMMARY OF THE INVENTION

The present invention is based on the observation that a particular characteristic of Voice over Internet Protocol traffic can make it difficult for some intrusion-detection systems to recognize a VoIP-based intrusion attempt. In particular, the illustrative embodiment is based on the fact that (i) Voice over Internet Protocol is a service that is supported by a plurality of protocols (e.g., SIP, RTP, etc.), and (ii) it is possible to attack a data-processing system via particular sequences of messages that span across two or more of these protocols.

For example, call hijacking is one type of VoIP-based intrusion. In call hijacking, an attacker sends a SIP REINVITE message to the VoIP user agent at the called terminal. Typically, a RENIVITE message is sent for call migration (e.g., transferring a call from a wireline phone to a cellular phone, etc.). However, a malicious REINVITE message sent by a third-party attacker can redirect RTP traffic sent to the called terminal to some other terminal.

Another example of a VoIP-based intrusion is called a BYE attack, the goal of which is to prematurely terminate a call. In a BYE attack, an attacker sends a faked SIP BYE message to a user agent A currently engaged in a VoIP call. User agent A, upon receiving the BYE message, concludes that the user agent of the remote party (user agent B) wants to terminate the call. Consequently, user agent A stops its outgoing RTP message stream immediately, while user agent B, unaware of the third-party BYE message, continues to send RTP messages to user agent A.

In both of these examples, an intrusion is based on messages for two application-layer protocols: SIP and RTP. Such intrusions can be thwarted in the illustrative embodiment of the present invention by including an appropriate cross-protocol rule in the intrusion-detection system rule base (i.e., a rule that has a pre-condition covering two or more protocols.) As will be appreciated by those skilled in the art, although the illustrative VoIP-based intrusions described above involve protocols SIP and RTP, some VoIP-based intrusions might be based on other protocol combinations. For example, some instant messaging attacks are based on a combination of SIP and IP messages.

As will be clear to those skilled in the art, in the illustrative embodiment of the present invention, cross-protocol rules can be employed to protect against intrusions that are based on services other than Voice over Internet Protocol. Moreover, as illustrated above, cross-protocol intrusions (whether VoIP-based or not) can employ sub-application-layer protocols (e.g., Internet Protocol, etc.) as well as application-layer protocols (e.g., SIP, RTP, etc.).

In addition to allowing cross-protocol rules, the intrusion-detection system of the illustrative embodiment is stateful (i.e., it allows rules with pre-conditions that are based on the state of a protocol in a particular session). As is well-understood in the art, the state of a protocol at any particular time during a session can be based on any prior events in the session (e.g., messages, timeouts, etc.). Moreover, a cross-protocol intrusion typically involves two or more sessions (e.g., a SIP session and a RTP session, etc.) that are interrelated in some fashion (e.g., the sessions belong to the same call, belong to the same transaction, etc.)

In the illustrative embodiment of the present invention, the firewall, like the intrusion-detection system, is stateful and is capable of employing cross-protocol rules. As will be appreciated by those skilled in the art, however, in some embodiments of the present invention the firewall might not be stateful, or might not be capable of employing cross-protocol rules like the intrusion-detection system.

The illustrative embodiment comprises generating at a data-processing system a signal based on (i) the state of a first protocol in a first session, and (ii) the state of a second protocol in a second session; wherein the first protocol is different than the second protocol.

DETAILED DESCRIPTION

Figure 1:
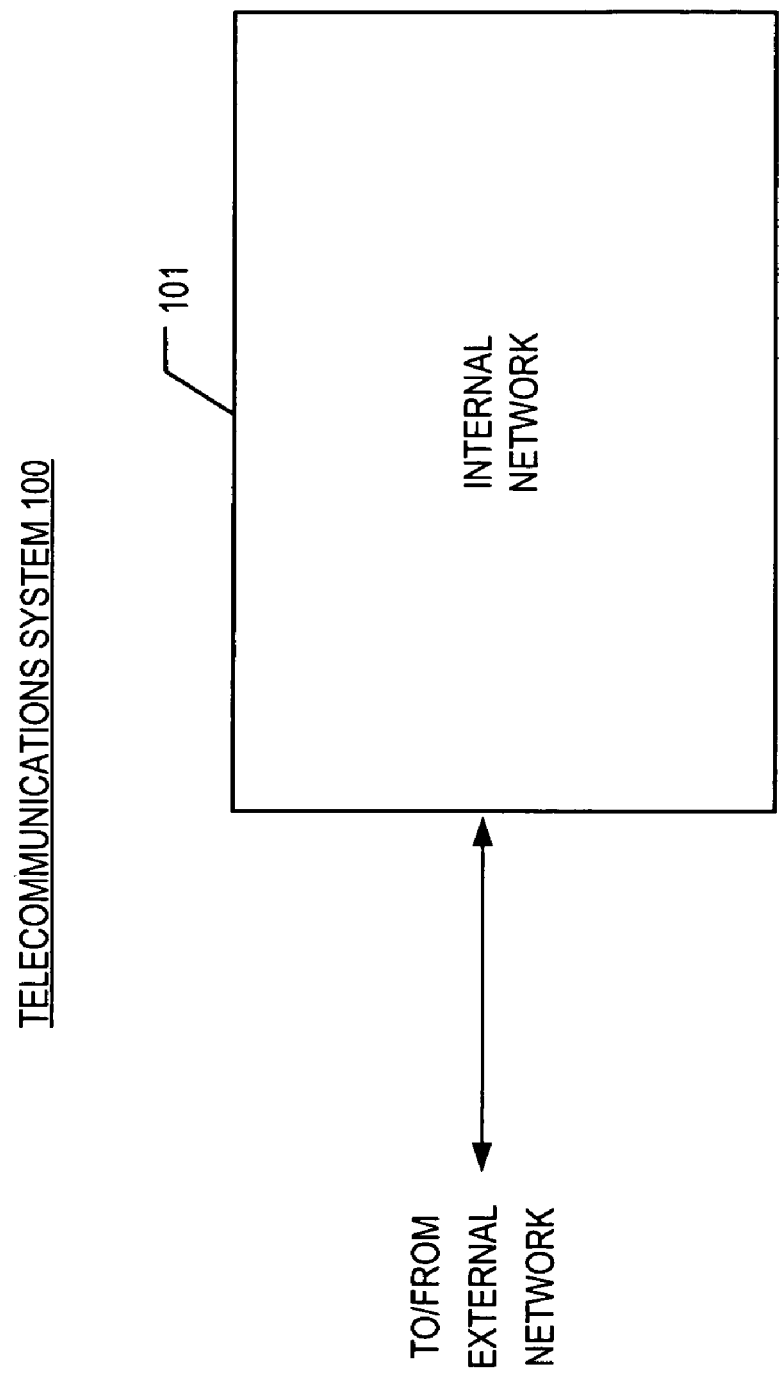
FIG. 1 depicts a schematic diagram of a telecommunications system in accordance with the prior art.
Figure 2:
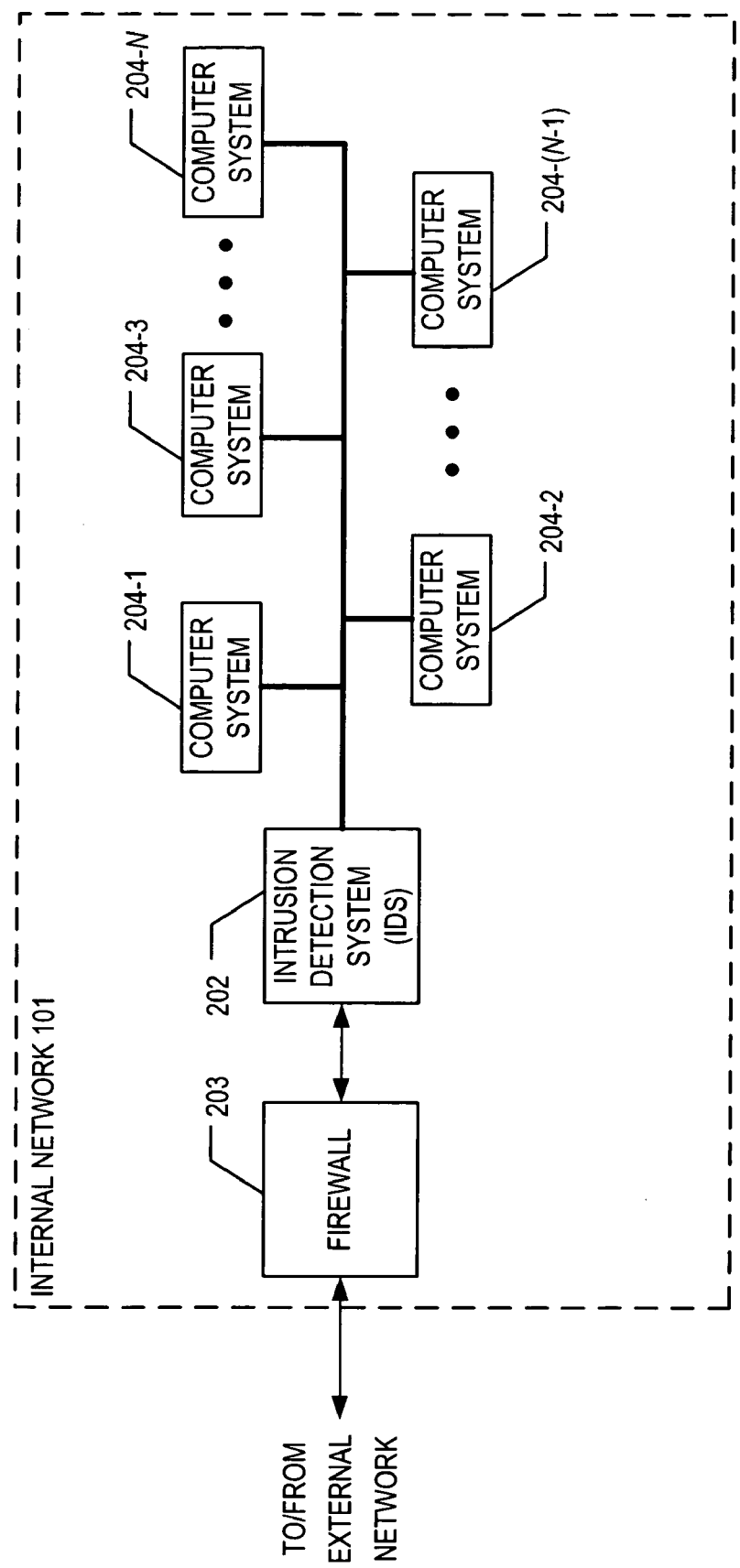
FIG. 2 depicts a schematic diagram of the elements of internal network 101, as shown in FIG. 1, in accordance with the prior art.
Figure 3:
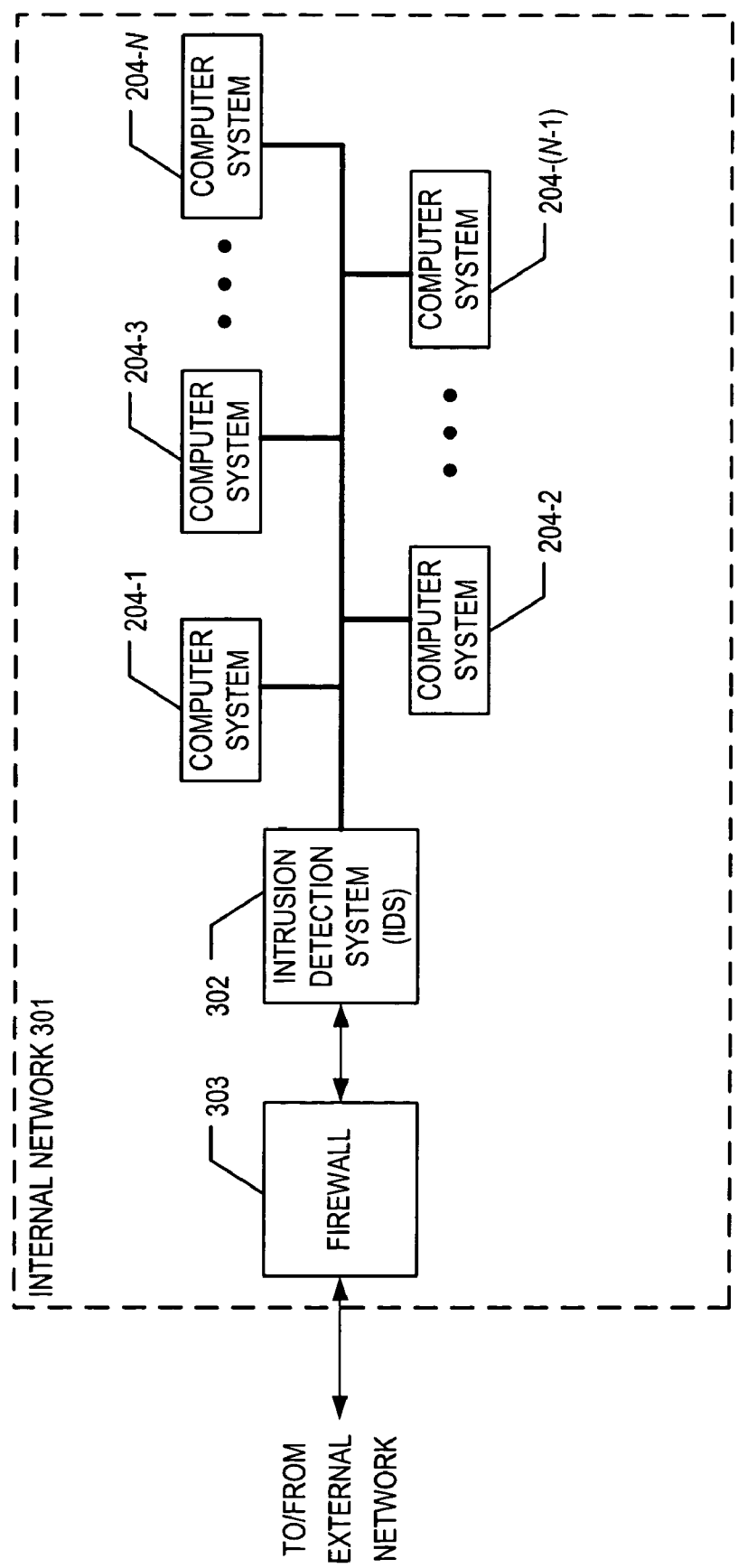
FIG. 3 depicts a schematic diagram of the elements of an internal network in accordance with the illustrative embodiment of the present invention.

FIG. 3 depicts a schematic diagram of the elements of internal network 301 in accordance with the illustrative embodiment of the present invention. As shown in FIG. 3, internal network 301 comprises: intrusion-detection system 302, firewall 303, and computer systems 204-1 through 204-N, where N is a positive integer, interconnected as shown.

Computer systems 204-1 through 204-N remain unchanged from the prior art in accordance with the illustrative embodiment of the present invention. Therefore no changes in software, hardware, etc. are required for any of computer systems 204 in order to make and use embodiments of the present invention.

Intrusion-detection system 302 is capable of protecting internal network 301 from some intrusion attempts, in accordance with the illustrative embodiment of the present invention. In particular, intrusion-detection system 302 is capable of storing stateful cross-protocol intrusion signatures in its rule base, and of recognizing intrusion attempts that match one or more of these signatures, as described below and with respect to FIGS. 4 and 5, Firewall 303 is capable of preventing selected incoming messages from entering further into internal network 301, in accordance with the illustrative embodiment of the present invention. As is described below and with respect to FIGS. 6 and 7, firewall 303 is capable of storing stateful cross-protocol rules in its rule base, and of blocking incoming messages accordingly based on one or more of these rules.

As will be appreciated by those skilled in the art, in some embodiments one or both of intrusion-detection system 302 and firewall 303 might also inspect outgoing messages from internal network 301. In such embodiments, an outgoing message might be blocked (e.g., a message for opening a File Transfer Protocol session, etc.), or an intrusion alert might be generated based on the outgoing message (e.g., a spoofed outgoing VoIP message, etc.).

As will further be appreciated by those skilled in the art, in some embodiments intrusion-detection system 302 might be a hardware-based "appliance" that comprises a processor and memory, while in some other embodiments intrusion-detection system 302 might be a program that runs on a server, personal computer, etc. Similarly, in some embodiments firewall 303 might be a hardware appliance that comprises a processor and memory, while in some other embodiments firewall 303 might be a program that runs on a server, personal computer, etc. As will be further appreciated by those skilled in the art, in some embodiments intrusion-detection system 302 and firewall 303 might belong to a single hardware appliance, or might be programs that run on a single platform.

Figure 4:
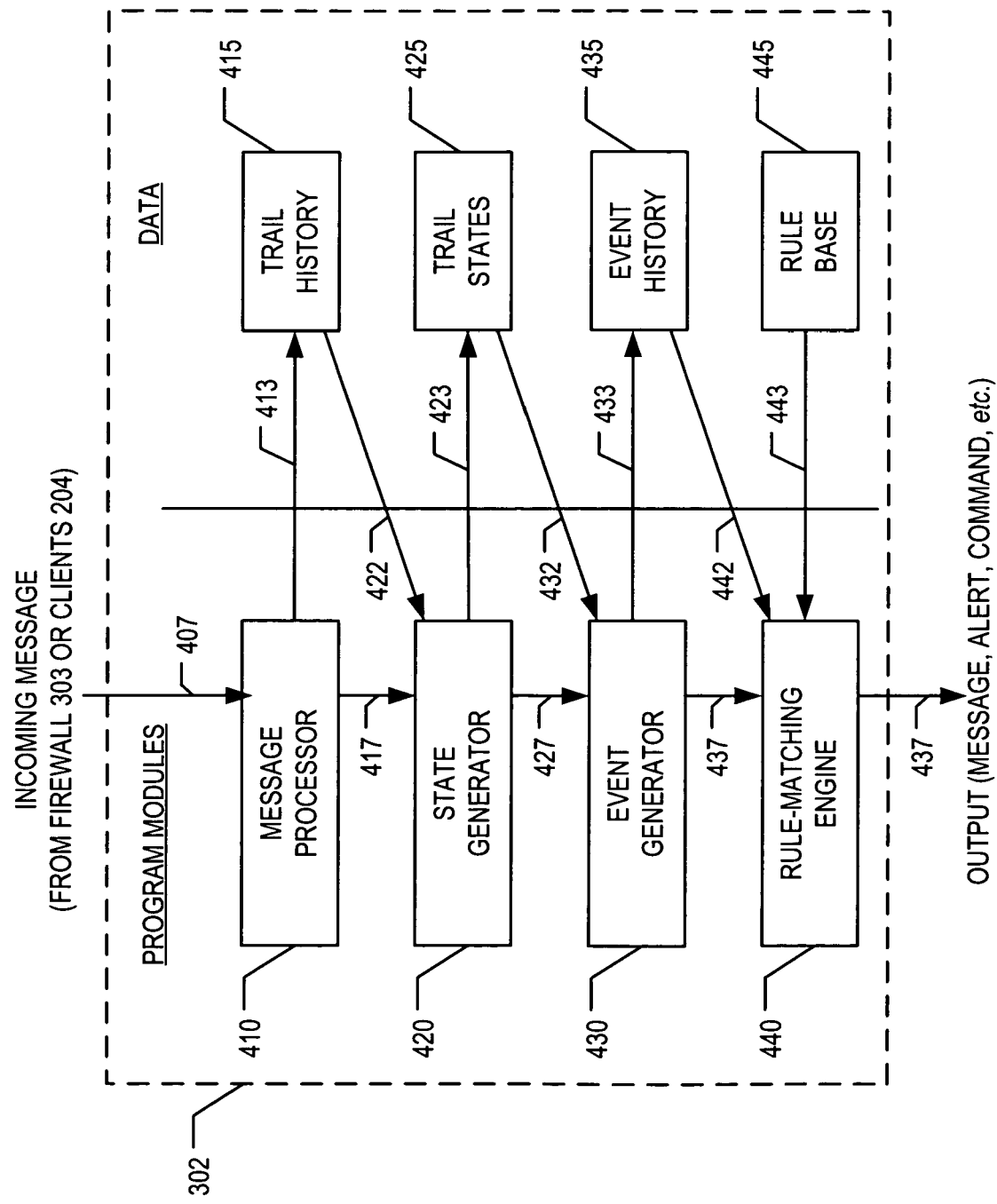
FIG. 4 depicts the logical architecture of intrusion-detection system 302, as shown in FIG. 3, in accordance with the illustrative embodiment of the present invention.

FIG. 4 depicts the logical architecture of intrusion-detection system 302, in accordance with the illustrative embodiment of the present invention. As shown in FIG. 4, intrusion-detection system 302 comprises four program modules: message processor 410, state generator 420, event generator 430, and rule-matching engine 440; and four data: trail history 415, trail states 425, event history 435, and rule base 445. The sequence of control- and dataflow-events that occur when an incoming message arrives at intrusion-detection system 302 is represented in FIG. 4 by events 407, 413, 417, 422, 423, 427, 432, 433, 437, 442, 443, and 447.

An incoming message arriving at intrusion-detection system 302 (dataflow-event 407) is received by message processor 410. Message processor 410 is capable of:

(i) fragmentation and reassembly in accordance with the appropriate protocol (e.g., Internet Protocol, etc.), (ii) protocol decoding, and (iii) storing a footprint (i.e., information about the message) in trail history 415 (dataflow-event 413).

Trail history 415 organizes footprints into trails that represent a particular session/protocol combination (e.g., a first SIP trail, a second SIP trail, a first RTP trail, etc.).

Control then passes to state generator 420 (control-event 417). State generator 420 reads updated trail history 415 (dataflow-event 422), generates one or more trail states (e.g., updates the state of an existing trail, initializes the state of a newly-created trail, etc.), and updates the information in trail states 425 accordingly (dataflow-event 423).

Control then passes to event generator 420 (control-event 427). Event generator 430 reads updated trail states 425 (dataflow-event 432) and generates one or more events based on this information. An event is a layer of abstraction that correlates the information in footprints and concentrates the information into a single descriptive entity. Events are advantageous because (i) they hide some details of the rule-matching process (described below), and (ii) they enable the triggering of rule-matching at the moment of interest rather than upon each incoming footprint, thereby improving performance. Event generator then updates event history 435 accordingly (dataflow-event 423), and control passes to rule-matching engine 440 (control-event 437).

Rule-matching engine 440 loads updated event history 435 (dataflow-event 442) and rule base 445 (dataflow-event 443) and attempts to match one or more events against rules of rule base 445. For example, rule base 445 might contain the following rule:

IF an RTP message from a user agent A is received after a SIP BYE message from user agent A
THEN generate a call-hijacking intrusion alert As is well-known to those of ordinary skill in the art, there are many methods for representing rules in a rule base and matching information (e.g., logical predicates, symbolic expressions, etc.) against such rules. If rule-matching engine 440 finds a matching rule, the rule is "fired" (e.g., an intrusion alert is generated, the incoming message is blocked, a new rule is added to rule base 445, etc.) as indicated by an output signal that is represented in FIG. 4 as event 447. If no matching rule is found, at event 447 the incoming message is output to the appropriate destination computer system 204 of internal network 301. (As described above, in some embodiments a message received at intrusion-detection system 302 might in fact be an outgoing message from internal network 301, in which case the message is passed on to firewall 303 at event 447.)

As will be appreciated by those skilled in the art, in some embodiments of intrusion-detection system 302, an alternative method of knowledge representation might be employed in lieu of the rule based system of the illustrative embodiment. For example, some embodiments might use decision trees, Bayesian inference networks, neural networks, etc. As will be further appreciated by those skilled in the art, in some embodiments of the present invention intrusion-detection system 302 might employ rules that are based on some combination of events, trail states, and individual footprints, instead of events alone. It will be clear to those skilled in the art how to make and use such embodiments after reading this specification.

Figure 5:
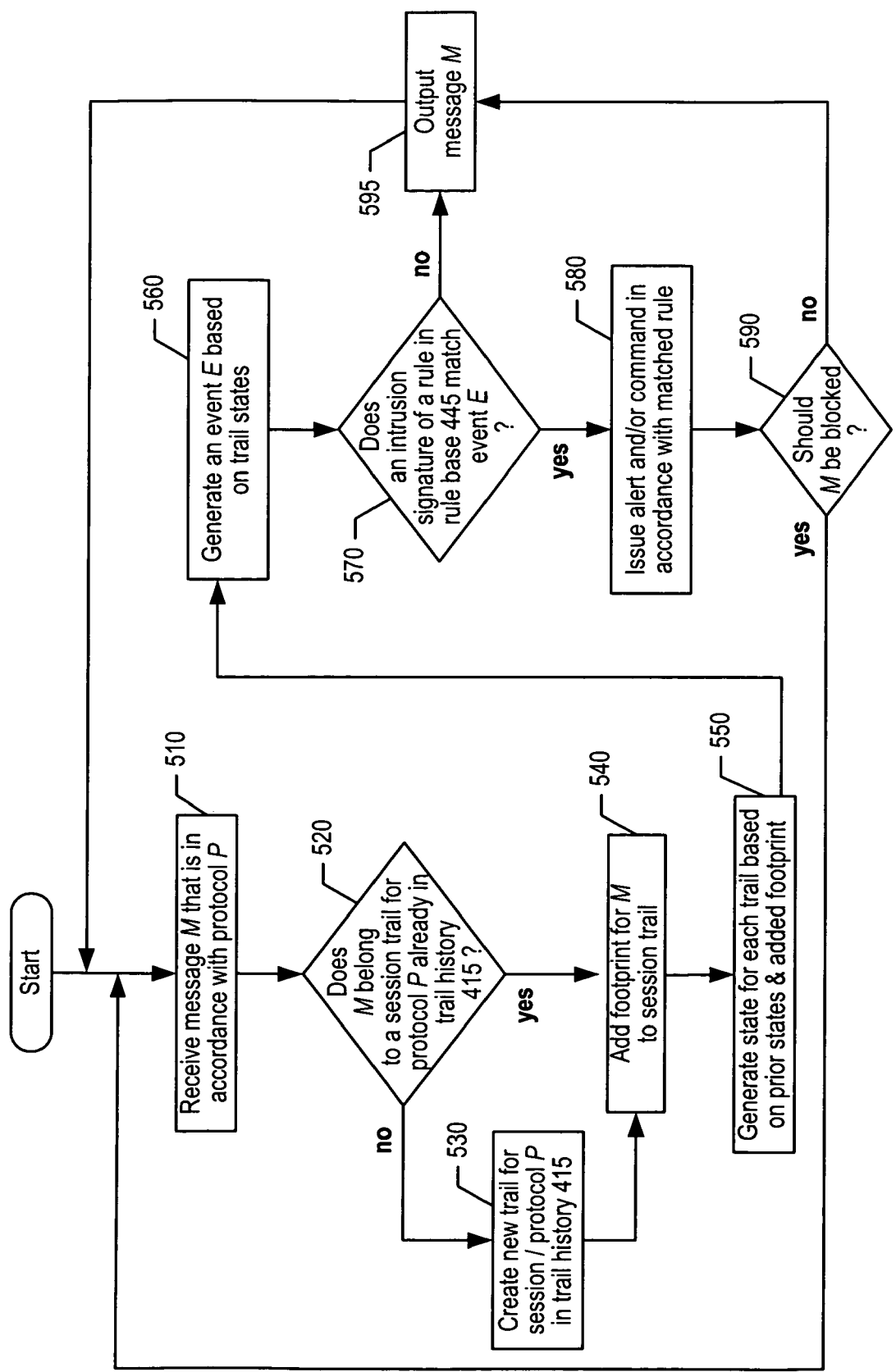
FIG. 5 depicts a flowchart of the salient tasks of intrusion-detection system 302, in accordance with the illustrative embodiment of the present invention.

FIG. 5 depicts the salient tasks of intrusion-detection system 302 in flowchart form.

At task 510, a message M that is in accordance with a protocol P is received, in well-known fashion.

Task 520 checks whether there is already a trail in trail history 415 that corresponds to the combination of (i) the session to which message M belongs, and (ii) protocol P. If so, execution continues at task 540; otherwise execution proceeds to task 530.

At task 530, a new trail that corresponds to the combination of (i) and (ii) above is created in trail history 415.

At task 540, information about message M (e.g., the sender of the message, the destination of the message, the type of message, the contents of the message, etc.) is stored in a footprint in the appropriate trail of trail history 415, in well-known fashion.

At task 550, updated states for each trail in trail history 415 are generated based on the prior states in trail history 415 and on the added footprint of task 540, in well-known fashion (e.g., via a state transition diagram, etc.).

At task 560, an event E is generated based on the updated trail states of trail history 415, and is stored in event history 435. As will be appreciated by those skilled in the art, task 560 can be accomplished by a variety of methods, such as associating arcs of a state transition diagram with an output event, etc.

Task 570 checks whether an intrusion signature of a rule in rule base 445 matches the events of event history 435, which includes newly-generated event E. If so, execution proceeds to task 580; otherwise, execution continues at task 595.

At task 580, an alert is issued, or an action is executed, or both, in accordance with the rule matched at task 570.

Task 590 checks whether message M should be blocked (i.e., prevented from exiting intrusion-detection system 302. If so, execution continues back at task 510; otherwise, execution continues at task 595.

At task 595, message M is output from intrusion-detection system 302, in well-known fashion. After task 595, execution continues back at task 510.

Figure 6:
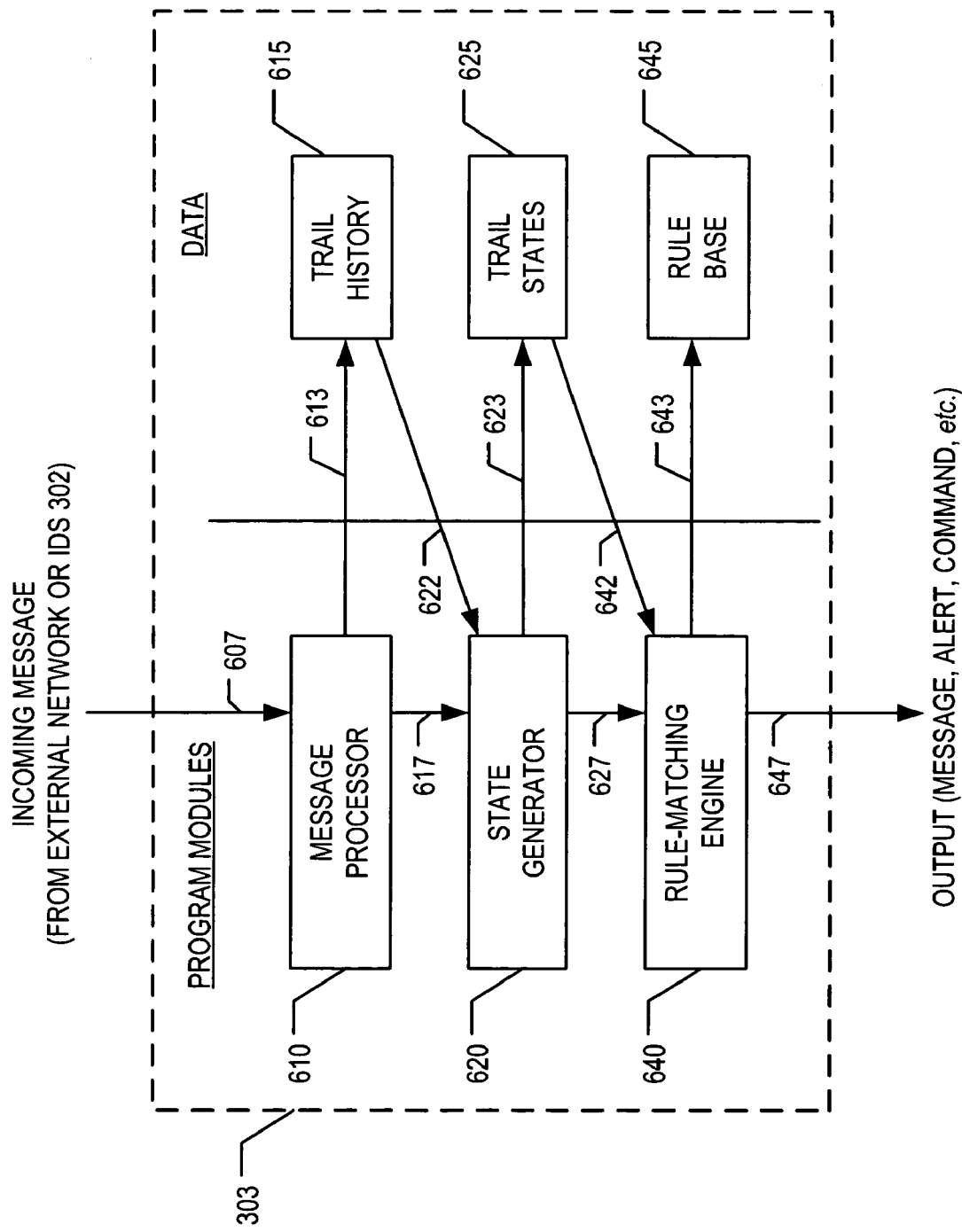
FIG. 6 depicts the logical architecture of firewall 303, as shown in FIG. 3, in accordance with the illustrative embodiment of the present invention.

FIG. 6 depicts the logical architecture of firewall 303, in accordance with the illustrative embodiment of the present invention. As shown in FIG. 6, firewall 303 comprises three program modules: message processor 610, state generator 620, and rule-matching engine 630; and three data: trail history 615, trail states 625, and rule base 645. The sequence of control- and dataflow-events that occur when an incoming message arrives at firewall 303 is represented in FIG. 6 by events 607, 613, 617, 622, 623, 627, 642, 643, and 647.

An incoming message arriving at firewall 303 (dataflow-event 607) is received by message processor 610. Message processor 610 is capable of:

(i) fragmentation and reassembly in accordance with the appropriate protocol (e.g., Internet Protocol, etc.),
(ii) protocol decoding, and
(iii) storing a footprint for the message in trail history 615 (dataflow-event 613).

Control then passes to state generator 620 (control-event 617). State generator 620 reads updated trail history 615 (dataflow-event 622), generates one or more trail states, and updates the information in trail states 625 accordingly (dataflow-event 623).

Control then passes to rule-matching engine 640 (control-event 627). Rule-matching engine 640 loads trail states 625 (dataflow-event 642) and rule base 645 (dataflow-event 643) and attempts to match one or more events against rules of rule base 645. As is well-known to those of ordinary skill in the art, there are many methods for representing rules in a rule base and matching information (e.g., logical predicates, symbolic expressions, etc.) against such rules. If rule-matching engine 640 finds a matching rule, the rule is "fired" (e.g., an intrusion alert is generated, the incoming message is blocked, a new rule is added to rule base 645, etc.) as indicated by an output signal that is represented in FIG. 6 as event 647. If no matching rule is found, at event 647 the incoming message is output to intrusion-detection system 302. (As described above, in some embodiments a message received at firewall 303 might in fact be an outgoing message from internal network 301 that intrusion-detection system 302 forwarded to firewall 303 after examination. In such cases, the message is transmitted via the external network to its destination.)

As will be appreciated by those skilled in the art, in some embodiments of firewall 303, an alternative method of knowledge representation might be employed in lieu of the rule based system of the illustrative embodiment. For example, some embodiments might use decision trees, Bayesian inference networks, neural networks, etc. As will be further appreciated by those skilled in the art, in some embodiments of the present invention firewall 303 might employ rules that are based on events, either instead of or in combination with trail states, as in the illustrative embodiment of intrusion-detection system 202. It will be clear to those skilled in the art how to make and use such embodiments after reading this specification.

Figure 7:
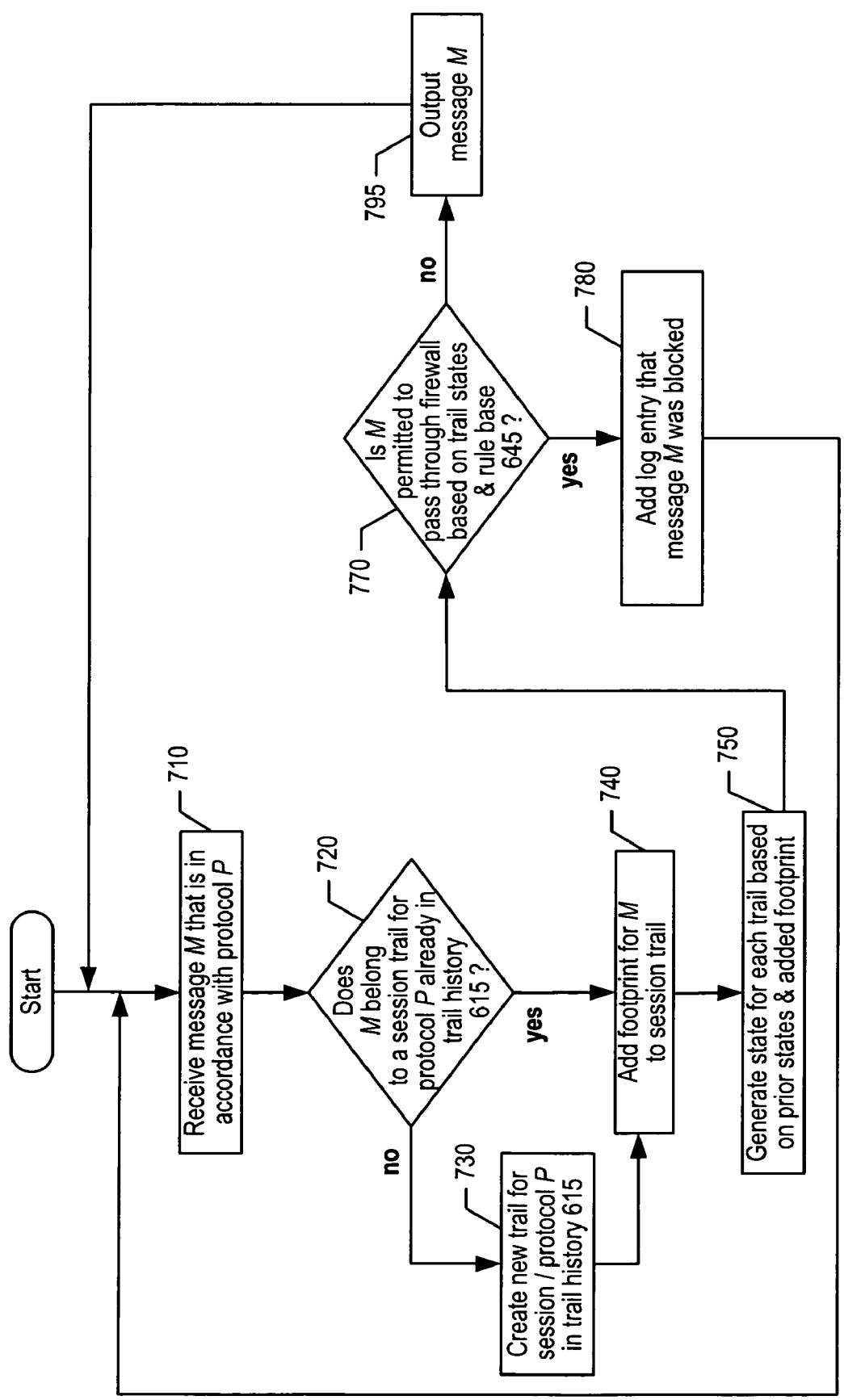
FIG. 7 depicts a flowchart of the salient tasks of firewall 303, in accordance with the illustrative embodiment of the present invention.

FIG. 7 depicts a flowchart of the salient tasks of firewall 303, in accordance with the illustrative embodiment of the present invention.

At task 710, a message M that is in accordance with a protocol P is received, in well-known fashion.

Task 720 checks whether there is already a trail in trail history 615 that corresponds to the combination of (i) the session to which message M belongs, and (ii) protocol P. If so, execution continues at task 740; otherwise execution proceeds to task 730.

At task 730, a new trail that corresponds to the combination of (i) and (ii) above is created in trail history 615.

At task 740, information about message M (e.g., the sender of the message, the destination of the message, the type of message, the contents of the message, etc.) is stored in a footprint in the appropriate trail of trail history 615, in well-known fashion.

At task 750, updated states for each trail in trail history 615 are generated based on the prior states in trail history 615 and on the added footprint of task 740, in well-known fashion (e.g., via a state transition diagram, etc.).

Task 770 checks, based on the trail states and rule base 645, whether message M is permitted to pass through firewall 303. If so, execution proceeds to task 780; otherwise, execution continues at task 795.

At task 780, an indication that message M was blocked is logged, in well-known fashion. After task 780, execution continues back at task 710.

At task 795, message M is output from firewall 303, in well-known fashion. After task 795, execution continues back at task 710.

Figure 8:
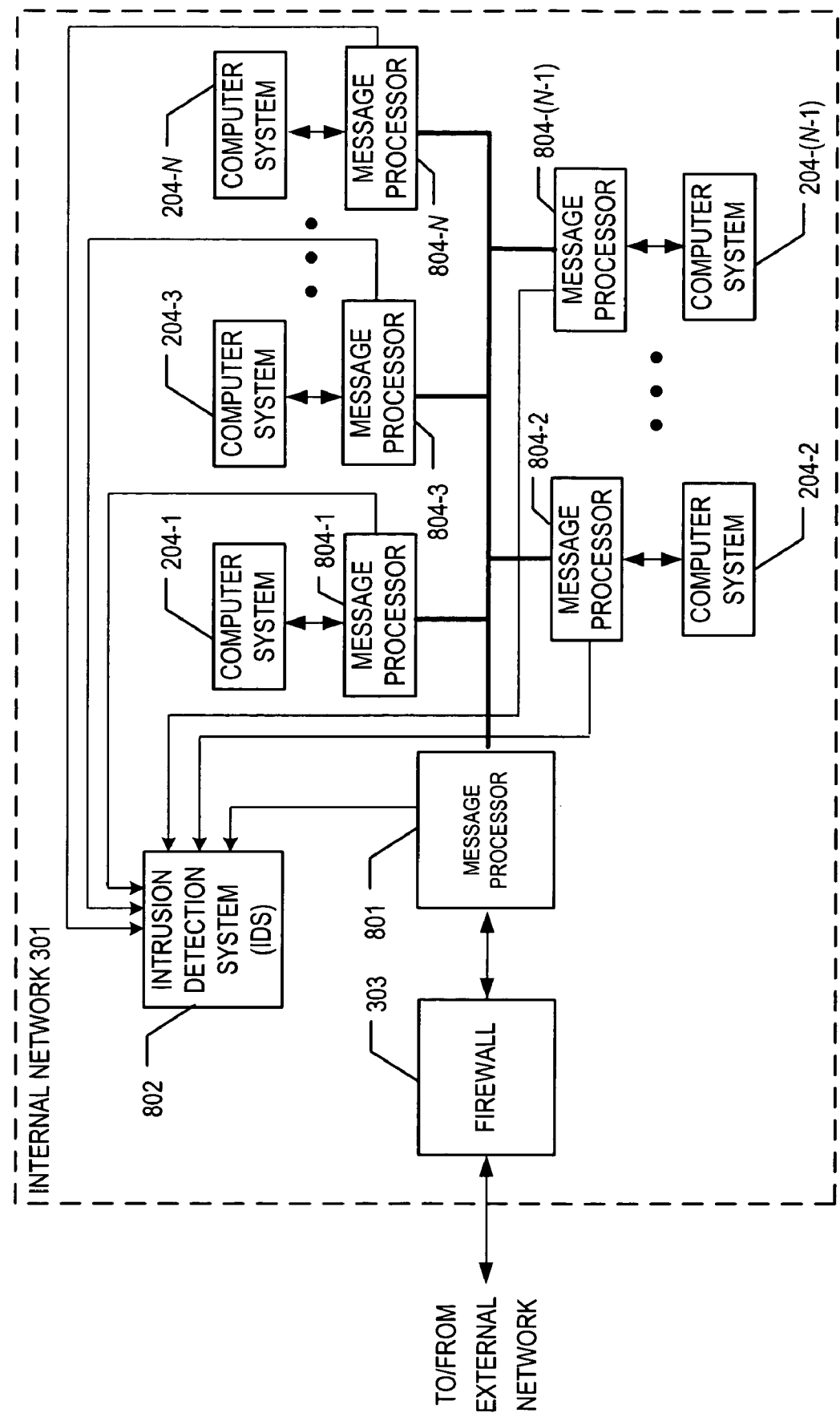
FIG. 8 depicts a schematic diagram of the elements of internal network 301, as shown in FIG. 3, in accordance with a second illustrative embodiment of the present invention.

FIG. 8 depicts a schematic diagram of the elements of internal network 301, in accordance with a second illustrative embodiment of the present invention. In this second illustrative embodiment, the functionality of intrusion-detection system 302 in the first illustrative embodiment is distributed among message processor 801, intrusion-detection system 802, and message processors 804-1 through 804-N.

The logical architecture of intrusion-detection system 802 is similar to that of intrusion-detection system 302 (i.e., FIG. 4), except that there is no message processor 410. The functions of message processor 410 are instead performed by message processor 801 and message processors 804-1 through 804-N. The output of message processor 801 and message processors 804-1 through 804-N (i.e., footprints) are transmitted to intrusion-detection system 802 to perform the remaining functions of intrusion-detection system 302 (i.e., state generator 420, event generator 430, and rule-matching engine 440).

An advantage of the second illustrative embodiment is that by distributing the message processing throughout internal network 301, attacks on internal communications (e.g., a VoIP call between two computer systems 204-*i* and 204-*j*, etc.) can be detected. A disadvantage of the second illustrative embodiment, however, is the added complexity in deploying and maintaining a distributed architecture. In addition, the proliferation of message processors in the second illustrative embodiment might result in substantially higher hardware costs. It will be clear to those skilled in the art how to make and use message processor 801, intrusion-detection system 802, and message processors 804-1 through 804-N of the second illustrative embodiment.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    (a) receiving at a data-processing system a message that is in accordance with a first protocol; and
    (b) generating at said data-processing system a signal based on:
    (i) said message, and
    (ii) the state of a second protocol in a session; wherein said first protocol is different than said second protocol, and wherein said signal indicates that at least one of:
    (i) said message should be blocked from reaching its destination; and
    (ii) a message that is received subsequently at said data-processing system should be blocked from reaching its destination.

2. The method of claim 1 wherein said signal indicates a potential intrusion.

3. The method of claim 1 wherein said first protocol and said second protocol are application-layer protocols.

4. The method of claim 1 wherein said first protocol and said second protocol support a service.

5. The method of claim 4 wherein said service is Voice over Internet Protocol.

6. A method comprising:
    (a) receiving at a data-processing system:
    (i) a first message that is in accordance with a first protocol, and (ii) a second message that is in accordance with a second protocol that is different than said first protocol; and (b) generating at said data-processing system a signal based on said first message and said second message, and wherein said signal indicates that at least one of:

(i) said first message should be blocked from reaching its destination;

(ii) said second message should be blocked from reaching its destination; and (iii) a message that is received subsequently at said data-processing system should be blocked from reaching its destination.

7. The method of claim 6 wherein said signal indicates a potential intrusion.

8. The method of claim 6 wherein said first protocol and said second protocol are application-layer protocols.

9. The method of claim 6 wherein said first protocol and said second protocol support a service.

10. The method of claim 9 wherein said service is Voice over Internet Protocol.

11. The method of claim 9 wherein said first message belongs to a first session; and wherein said second message belongs to a second session; and wherein said first session and said second session belong to a transaction.

* * * * *